(12) United States Patent
Spes

(10) Patent No.: US 10,762,760 B2
(45) Date of Patent: Sep. 1, 2020

(54) CHILD CAR SEAT WITH AN INTEGRATED ANTI-OVERHEATING SAFETY SYSTEM

(71) Applicant: Andrej Spes, Novo Mesto (SI)

(72) Inventor: Andrej Spes, Novo Mesto (SI)

(73) Assignee: ANIG D.O.O., Novo Mesto (SI)

( * ) Notice: Subject to any disclaimer, the term of this patent is extended or adjusted under 35 U.S.C. 154(b) by 8 days.

(21) Appl. No.: 16/342,521

(22) PCT Filed: Apr. 9, 2018

(86) PCT No.: PCT/IB2018/052452
§ 371 (c)(1),
(2) Date: Apr. 16, 2019

(87) PCT Pub. No.: WO2019/030580
PCT Pub. Date: Feb. 14, 2019

(65) Prior Publication Data
US 2019/0243397 A1   Aug. 8, 2019

(30) Foreign Application Priority Data

Aug. 11, 2017   (SI) .................................... 201700232

(51) Int. Cl.
*G08B 21/02* (2006.01)
*B60N 2/00* (2006.01)

(52) U.S. Cl.
CPC ............ *G08B 21/02* (2013.01); *B60N 2/002* (2013.01); *G08B 21/0205* (2013.01)

(58) Field of Classification Search
CPC ............... G08B 21/02; G08B 21/0205; G08B 21/0225; G08B 21/0238; G08B 21/0277; G08B 21/028; B60N 2/002; B60N 2/26; B60N 2/2821; B60N 2/2842; B60N 2/2884

See application file for complete search history.

(56) References Cited

U.S. PATENT DOCUMENTS 5,833,309 A   11/1998   Schmitz
5,949,340 A   9/1999   Rossi
(Continued)

*Primary Examiner* — Van T Trieu
(74) *Attorney, Agent, or Firm* — Bryant J. Keller; Kirton McConkie

(57) ABSTRACT

The child car seat with the integrated overheating protection for children provides a solution for the problem of overheating children, which may occur if the child is forgotten in a car, where the sun and other external influences may cause the child to overheat. The child car seat with the integrated overheating protection for children has an integrated temperature sensor, which, at elevated temperatures inside the car, and adjustable through the temperature button, triggers an audible alarm warning, which transmits sound or recorded messages stored in the processor. A certain amount of time after the elevated temperatures have been detected by the temperature sensor, the processor opens a valve, which begins to controllably release water from the water storage container and so begins the cooling-off phase of the child. After the system of the child car seat with the integrated overheating protection for children has been activated, we can dry the seat and refill it with water through the valve so it is ready to be used again.

20 Claims, 2 Drawing Sheets

(56) References Cited

U.S. PATENT DOCUMENTS

| | | | |
|---|---|---|---|
| 6,485,081 B1 * | 11/2002 | Bingle | E05B 83/26 |
| | | | 292/DIG. 43 |
| 9,008,854 B2 * | 4/2015 | Breed | G01C 21/26 |
| | | | 701/1 |
| 2008/0004774 A1 | 1/2008 | Wieczorek et al. | |

* cited by examiner

CHILD CAR SEAT WITH AN INTEGRATED ANTI-OVERHEATING SAFETY SYSTEM

BACKGROUND

The subject matter of the invention is a technical system of elements integrated into a child car seat, which alerts you if the child is overheating and provides cooling, if necessary.

BRIEF SUMMARY OF THE INVENTION AND RELATED ART

The problem that the invention is trying to solve is to prevent children from overheating when left in a car etc., which gets heated through solar radiation, through the closed windows of the car in which the child is sitting. The presented technical system is also capable of cooling the child down in case the audible alarm warning, which is triggered at elevated temperatures, does not reach its primary goal of alerting the parents, who would remove the child from the car.

There are several known cases where parents have forgotten their child in the car and went on errands. During the summer months, when the car is exposed to strong sunlight, the temperatures inside the car can reach more than 90 degrees Celsius. According to media reports, there have unfortunately been many cases where a child has died due to overheating, which was the result of the circumstances described above.

Because nowadays many children's parents are more and more mentally burdened, which, sadly, is the developing trend of our society, the number of such cases, where a child is forgotten in a car, is increasing. While the children are in the car, they sleep most of the time and don't draw any special attention to themselves, and so it can very easily happen that the increasingly stressed out and mentally fatigued parents forget their child in the car. If such a thing happens in the summer, when the temperatures are very high, it can have fatal consequences for the child.

The technical invention described below suggests a technical way for preventing leaving a child alone in the child seat, which is installed in the rear of your car, and additionally proposes a technical solution for cooling the child in case the parents don't respond to the warning signal of the child car seat, which is designed to prevent parents from forgetting their children in the car.

The current technical knowledge is, unfortunately, still unable to anticipate such events and provide similar solutions and warnings.

The technical knowledge to date is primarily focused on providing safety for the child seated in a child car seat, installed in the car, in the event of a collision, rollover or similar mechanical stresses on the body, which could affect the child in the child car seat.

What is common to all known technical solutions is that their designers did not consider the possibility that a child might be forgotten and left in an overheated car, therefore they don't suggest any solutions to provide safety for the children in case of such an event.

DETAILED DESCRIPTION OF THE INVENTION

Figure 1:
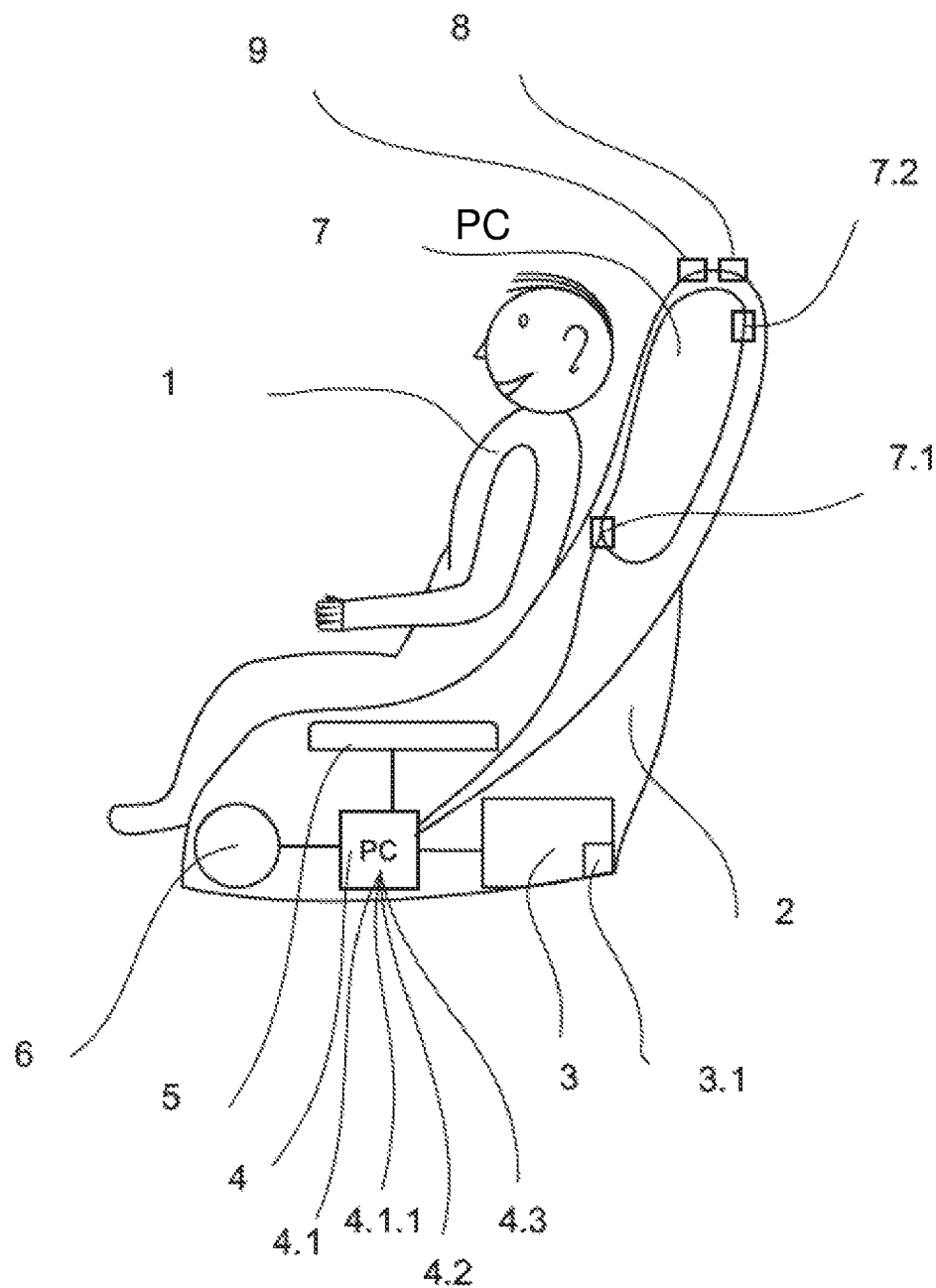
FIG. 1 shows a schematic view of the child car seat with the child and all the related technical elements which are necessary to protect the child from overheating.

This invention proposes a technical solution to this problem with an integrated warning speaker/sound alarm, which is triggered when the vehicle is stationary and when the temperature inside rises above 37 degrees Celsius. The system can also trigger other applications, such as a phone call to the parents, the opening of car windows, etc.

The proposed invention also includes a technical invention of a system for cooling the child, which is activated after a certain period of time after the sound alarm warning has been triggered, if the child has not been removed from the car.

The child car seat is a movable device, which is fitted into the car with belts, specific technical fittings, called ISOFIX, or similar attachment systems.

Our technical invention does not describe these technical solutions, since they are known technical knowledge and have no impact on the problem the technical invention is trying to solve.

According to our invention, the child car seat with an integrated overheating protection for children (2) has the following internally installed technical elements:

A battery (3), which powers the child car seat with an integrated overheating protection for children (2) even when it is not connected to the power supply of the vehicle.

A plug (3.1), which is designed for a 12V electric car socket.

A PC or a processor (4), which connects all the technical elements and with its programmed logic, which is described below, controls all the technical elements built-in into the child car seat, with an integrated overheating protection for children (2), ensuring the protection of the child (1) against overheating.

A scale (5) with a weighing or child (1) detection function, installed in the child car seat with the integrated overheating protection for children (2).

An audible alarm (6), which has the function of producing an audible warning in case of elevated temperatures in the car, when a child (1) is seated in the child car seat with the integrated overheating protection for children (2).

A water storage container (7), which has the function of cooling down the child (1), if after a certain amount of time, after the audible alarm (6) warning has been triggered, the child (1) was not removed from the child car seat with the integrated overheating protection for children (2).

A valve (7.1), which the processor (4) opens up in case the child (1) was not removed from the child car seat with the integrated overheating protection for children (2) after a certain amount of time has passed since the first audible alarm warning (6).

A valve (7.2) through which the water storage container (7) can be refilled.

A temperature sensor (8), which constantly measures the temperature near the child's (1) head and is electrically connected to the processor (4).

A motion sensor (9), which monitors whether the vehicle is stationary or driving and is electrically connected to the processor (4).

The battery (3) is electrically connected with the plug (3.1), whose purpose is to charge the battery (3) through the car socket and give the processor (4) the signal that the system is connected to the 12V car power network. The processor (4) is electrically connected to the battery, which gives it the necessary power for the controlling function it performs.

The temperature sensor (8) and the motion sensor (9) are both electrically connected to and powered by the processor (4).

The scale (5) and the valve (7.1) are both electrically connected to and powered by the processor (4).

The audible alarm warning (6) is electrically connected to and powered by the processor (4).

The processor (4) powers all the described elements via the battery (3), which has a built-in time relay (4.1), a delay button (4.1.1), a temperature button (4.2) and a timer (4.3).

The water storage container (7) is designed to hold 1-5 litres of water, which is filled during the production process of the child car seat with an integrated overheating protection for children (2) and contains ingredients which prevent water oxidation or the formation of toxic substances in the water. All the ingredients added to the water are carefully selected, so they have no harmful effects on the child (1) in case it comes into contact with them. All the ingredients added to the water are chosen in such a way, that small quantities of this water, which may accidentally be ingested by the child, are considered drinkable.

Figure 2:
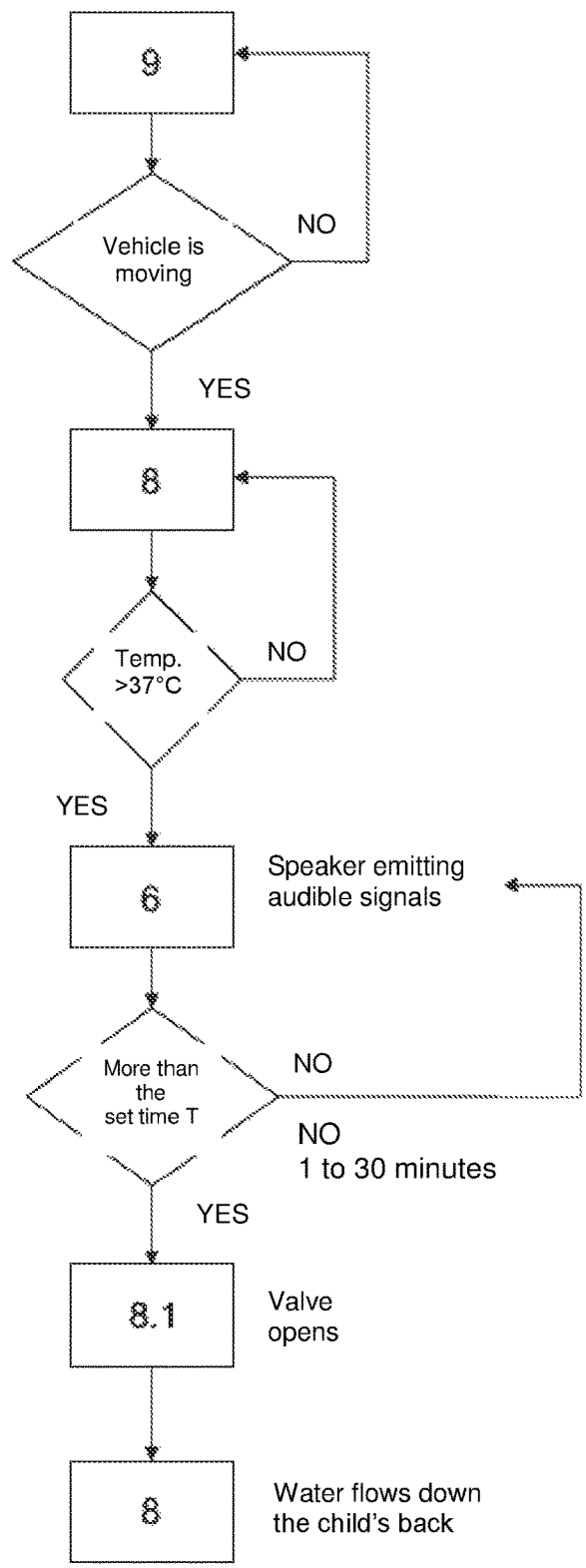
FIG. 2 shows a diagram of signal paths between the elements in the event of an increased temperature.

The triggering of the system is depicted in FIG. 2 and described in the text below:

If the scale (5), which detects the weight of the child (1), measures a weight above 100 grams the whole system activates and remains active for the duration of T1, which is from 15 minutes to 5 hours. With this mechanism we prevented the scale (5) from being constantly turned on and turned off through the movements of the child (1), which could cause the failure of the whole system or a the failure of the processor (4).

In case the scale (5) does not detect any weight higher than 100 grams for the duration of T1, the safety system remains inactive or is turned off, since in this case the child car seat with the integrated overheating protection for children (2) is empty or no child (1) is seated in it. The time T1 can be adjusted via the delay button (4.1.1), which controls the time relay (4.1), which in turn signals the processor (4) to shut the system down.

When the vehicle is in motion and the scale (5) detects the minimal required weight of the child (1), elevated temperatures are not anticipated, since it is expected that the driver will regulate the temperature inside the vehicle in such a way, that it does not exceed the limit at which the lives of the passengers would be in danger.

Therefore, if the motion sensor (9) signals the processor (4) that the vehicle is moving, regardless of whether the child (1) is seated in the child car seat with the integrated overheating protection for children (2) or not, the whole system is deactivated.

As soon as the vehicle stops comes to a standstill, the motion sensor (9) stops sending signals, which results in the whole safety system being activated through the processor (4), which, thanks to the built-in time relay (4.1), remains turned on for the time T1, which can be adjusted through the delay button (4.1.1) from 15 minutes to 5 hours. This setting method and the time are exactly the same as the ones described previously in the deactivation process, when the child's (1) weight is not detected by the scale (5) for more than the specified time T1. In this way we prevent the system from triggering when there is no child seated in the child car seat with the integrated overheating protection for children (2).

With it we also prevent the system from turning off when the vehicle is stationary and an external force like the wind or similar forces may rock the vehicle from time to time.

If there was no integrated time relay (4.1) and delay button (4.1.1), the system would uncontrollably turn on and off, which could lead to technical problems of the system or a system failure.

With the added time relay (4.1), we have cancelled out the occasional rocking of the vehicle, which could be caused by external influences and made sure the system receives reliable data that the vehicle or the child car seat with the integrated overheating protection for children (2) is stationary.

The temperature sensor (8) operates constantly, and continually sends signals or temperature data to the processor (4). With the temperature button (4.2) we can adjust the temperature at which we want the safety system to activate. This temperature button (4.2) is integrated into the processor (4) or located in a prominent position of the child car seat with the integrated overheating protection for children (2) and is electrically connected to the processor (4).

The safety system is designed in such a way that the temperature cannot be set higher than 37 degrees Celsius with the temperature button (4.2), since the child's (1) life might be in danger by doing so.

With the temperature button (4.2) we can only adjust the temperature at which the safety system is activated, that is lower than 37 degrees Celsius.

When the temperature sensor (8) signals the processor (4) that the temperature is higher than the temperature value set with the temperature button (4.2), the safety system is activated by first turning on the audible alarm warning (6), which begins producing different audible sounds, but can also transmit a message, which can be entered into the processor (4). The message can contain information about the license plate number of the car, the type of car or a message such as "Rescue me from the car" or something similar.

The processor (4) can have a function where any owner/user/parent may enter the message they wish to appear.

If no specific message is entered into the processor (4), the processor (4) will begin to play the standard pre-set audible alarm warning (6) through the speaker, which ranges from various sounds to an audible warning with or without a meaning.

The processor (4) also has an output for communicating with the car, through which it can open the car windows, turn on the hazard lights, the car alarm, etc., if the car can be connected in such a way.

The processor (4) is also equipped with an output for a phone application for the child car seat with the integrated overheating protection for children (2), which can send messages, notify or call the owner/user/parent in case the safety system is activated.

In case the audible alarm warning (6) of the speaker is not answered and the child's (1) weight is still detected by the scale (5) and the time signals for the deactivation of the system through the scale and the motion sensor are set for a period from 15 minutes to 5 hours, which is described at the beginning of the description of the safety system, the following happens:

After a certain period of time, which can be adjusted with the timer (4.3) from 1 minute to a maximum of 30 minutes after the activation of the audible alarm warning (6), the valve (7.1) is opened through the processor (4) and begins to controllably release water from the water storage container (7).

In such a case the processor (4) opens the valve (7.1) according to the threshold values set with the timer (4.3).

Water from the water storage container (7) flows through the valve (7.1) with a relatively low and controlled flow rate, which is intended to be between 0.1 and 1 litre every 10 minutes.

In this way the pads of the child car seat with the integrated overheating protection for children (2) get wet. The water then passes through the child's clothing onto the child (1) or onto the back of the child.

When in contact with the child's (1) skin, the water evaporates and in doing so the so called latent heat, which is needed for the water to evaporate, is consumed, which in turn cools the child down (1).

The child car seat with the integrated overheating protection for children (2) activated in this way prevents the overheating of the child (1), because with the amount of 1-5 litres of water, with a very high specific energy, in the water storage container (7) a great deal of the heat energy can be consumed.

When at least one of the following measurement devices:
1. Scale (5)
2. Temperature sensor (8)
3. Motion sensor (9)
4. Temperature button (4.2)

reaches values below the threshold, the safety system is shut off through the processor (4).

The safety system is turned back on again when one of the threshold parameter values is exceeded again.

The activated child car seat with the integrated overheating protection for children (2) can be dried after being used and filled again with water through the valve (7.2).

The child car seat dried and refilled with water, together with the integrated overheating protection for children (2) and its safety system are now ready to be used again.

Cooling the child (1) with water cannot cause hypothermia, because it is only activated if the temperature inside the car is greater or equal to the temperature set with the temperature button (4.2), which has an option to set the temperature between 33 and 37 degrees Celsius. If the temperature of the temperature sensor (8) exceeds 37 degrees Celsius, the safety system activates, regardless of what the temperature button (4.2) is set to.

Since the temperature in the car heats the water in the water storage container (7) up to the same temperature, the child (1) cannot experience hypothermia.

The presented invention also offers an option with an empty water storage container (7), which would mean that the activated valve (7.1) wouldn't let any water through from the water storage container (7), because there would be no water in it.

Therefore the valve (7.1) also has the function of a pressure switch, which measures the hydrostatic pressure of water in the water storage container (7), which should be in the range between 0.01 and 0.02 bar. The water storage container (7) is 10 to 20 cm in height, this is why the pressure of the water on the valve (7.1) installed below is between 0.01 and 0.02 bar.

The valve (7.2) through which the water storage container (7) has a built-in pinhole, which helps to regulate the pressure difference in the water storage container (7), which arises due to the differences in the temperature of the water and air in the container (7).

The storage water container (7) is only filled to 90% of the maximum volume to prevent water from spilling over through the pinhole in the valve (7.2), which could happen due to the expansion of the water caused by the rise in temperature. With an increased temperature, we mean a temperature in the range around 33 degrees Celsius. At higher temperatures, depending on the temperature button (4.2) settings, the safety system is activated as described above.

The child car seat with the integrated overheating protection for children (2) is also available without the storage water container (7) and thus without the cooling-off function for the child (1). Therefore, it is only equipped with the safety system that alerts the user in case the child (1) is overheating.

The child car seat with the integrated overheating protection for children (2) is continuously connected to the 12V car power supply via the standard car plug (3.1), which is plugged into the standard car socket.

In most cars, the 12V power socket only becomes active if the car's ignition system is switched on. If we turn off the car or remove the ignition key of the car, the 12V power socket will lose its power supply.

Therefore the processor (4) of the child car seat with the integrated overheating protection (2) also has an option where it is able to trigger the safety system even if the plug (3.1) is not plugged into the car socket or if it has no power supply and the temperature sensor (8) detects a temperature equal or higher than the temperature set to activate the safety system.

This function of the child car seat with the integrated overheating protection for children (2) represents an additional level of protection against overheating for the child (1).

The invention claimed is:

1. A child car seat with an integrated overheating protection for children comprising:
   a battery with a plug,
   a processor with a time relay,
   a delay controller,
   a temperature controller,
   a time controller,
   a scale,
   an audible alarm warning,
   a water storage container with a valve,
   a temperature sensor, and
   a motion sensor,
   wherein the processor is configured to activate at least one of the audible alarm warning and the valve of the water storage container based on a signal from at least one of: (i) the scale, (ii) the temperature sensor, and (iii) the motion sensor.

2. The child car seat according to claim 1, wherein the plug is configured to couple to a standard 12V electrical car system socket to charge the battery.

3. The child car seat according to claim 2, wherein the processor is powered by the battery.

4. The child car seat according to claim 2, wherein the processor is configured to activate even if the plug is not plugged into the 12V electrical car system socket or if the plug is not receiving any power from the 12V electrical car system socket, when the temperature sensor detects a temperature higher than a set temperature.

5. The child car seat according to claim 1, wherein the processor at least one of (i) retrieves data from and (ii) controls the following elements: the scale, the audible alarm warning, the valve, the temperature sensor, and the motion sensor.

6. The child car seat according to claim 1, wherein the processor is connected to the scale, the audible alarm warning, the valve, the temperature sensor, and the motion sensor via electrical conductors.

7. The child car seat according to claim 1, wherein the valve is disposed in the child car seat at a location that is configured to be near a height of a child's loins when the child is sitting in the child car seat, wherein the water storage container is configured to release water from the valve, wherein the water storage container has a volume of 1 liter to 5 litres, and wherein the child car seat further comprises a pad that is configured to absorb water that is released from the water storage container.

8. The child car seat according to claim 1, wherein the temperature sensor is disposed near a headrest portion of the car seat.

9. The child car seat according to claim 8, wherein the temperature sensor is configured to send data about a temperature relating to the child car seat to the processor, which is configured to constantly compare the data with a set temperature, such that when the processor detects a temperature equal or higher than a temperature set by the set temperature controller, the processor triggers the audible alarm warning.

10. The procedure of the child car seat according to claim 9, wherein the audible alarm warning is configured to at least one of (i) send a message, and (ii) play a melody.

11. The child car seat according to claim 9, wherein the processor is configured to simultaneously activate the audible alarm warning and to at least one of: (i) activate an application which sends a message to a phone and (ii) use the processor to at least one of: (a) open a vehicle window, (b) activate a vehicle alarm, and (c) turn on a light of a vehicle holding the child car seat.

12. The child car seat according to claim 9, wherein when the processor activates the audible alarm warning, the time controller starts a timer, which is configured to be set from 1 minute to 30 minutes, and when a set time is reached, the processor is configured to open the valve such that water begins to controllably flow from the water storage container with a flow rate of between 0.1 litre and 1 litre per 10 minutes, and such that the water runs to a material of the child car seat.

13. The child car seat according to claim 1, wherein the valve is disposed at a bottom portion of the water storage container and at a backrest portion of the car seat, and wherein the valve is configured to: (i) measure a hydrostatic pressure of water in the water storage container and (ii) allow water to be selectively released from the water storage container.

14. The child car seat according to claim 1, wherein the time relay defines an operational time of the processor, regardless of whether or not the scale detects a weight of a child, and wherein a turn-on time of the time relay is controlled with the delay controller in a range of between 15 minutes and 5 hours.

15. The child car seat according to claim 1, wherein the scale is operably connected to a seating part of the child car seat.

16. The child car seat according to claim 15, wherein the scale is configured to constantly send data about a weight greater than 100 grams in the child car seat to the processor, which, based on information that the weight is greater than 100 grams, activates a safety function of the child car seat.

17. The child car seat according to claim 16, wherein if the scale does not send a signal about detecting the weight greater than 100 grams, for longer than a specified time period, the safety function shuts off.

18. The child car seat according to claim 1, wherein the motion sensor is configured to send motion data to the processor, which based on a setting of the time relay, is configured to activate a safety function of the child car seat when a stationary time measured by the motion sensor is longer than a set time.

19. A child car seat with a system for providing overheating protection to a child, the system comprising:
a child car seat comprising:
a battery;
a processor;
an audible alarm warning;
a water storage container with a valve;
a temperature sensor; and
wherein the temperature sensor is in signal communication with the processor, and
wherein the processor is configured to activate at least one of: (i) the audible alarm warning and (ii) the valve of the water storage container based on input from the temperature sensor.

20. The child car seat of claim 19, wherein the child car seat further comprises a motion sensor and a scale, wherein the motion sensor and the scale are in signal communication with the processor, and wherein the processor is configured to activate the at least one of: (i) the audible alarm warning and (ii) the valve when (a) the motion detector determines that the child car seat is not moving, (b) the scale determines that there is a weight in the child car seat, and (c) the temperature sensor determines that the child car seat is exposed to a temperature above a set level.

* * * * *